M. J. EGERY.
Improvement in Saw-Mills.
No. 114,426.  Patented May 2, 1871.
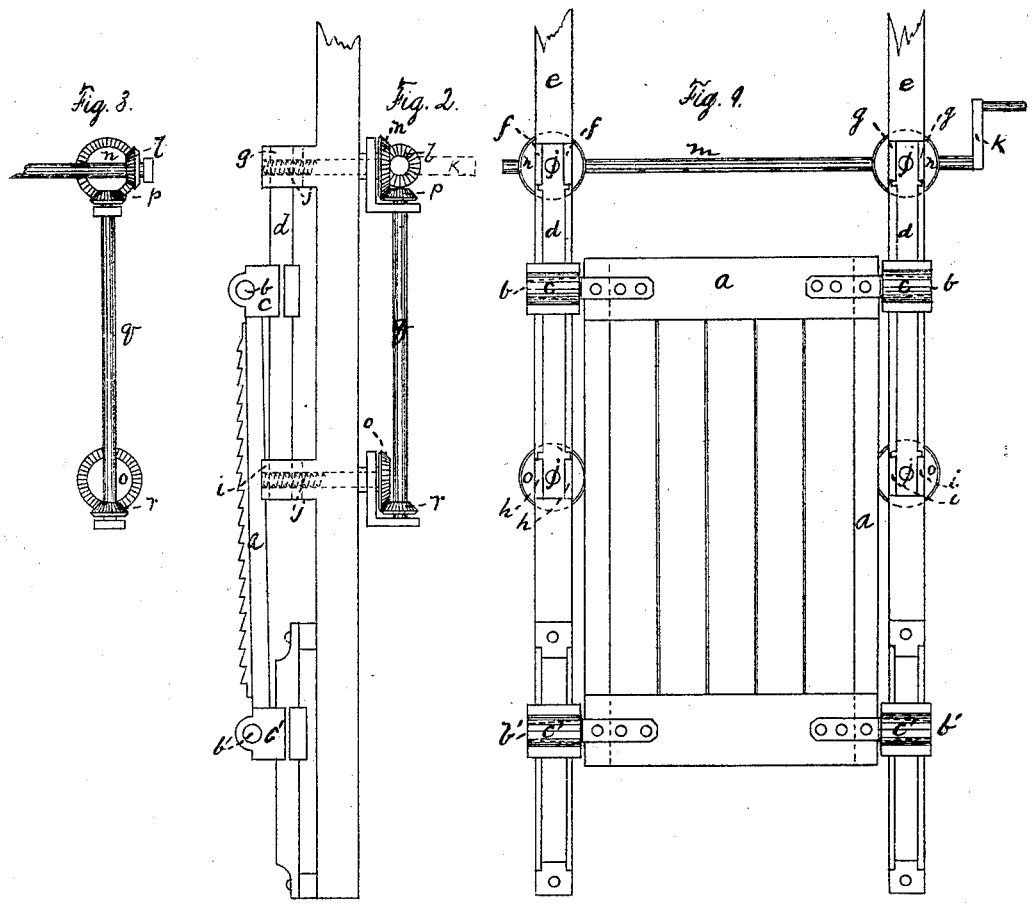
Witness
H. D. Fuller
John Williams
Inventor
Marshal J. Egery
By W. F. Searly Atty

UNITED STATES PATENT OFFICE.

MARSHAL J. EGERY, OF BANGOR, MAINE, ASSIGNOR TO HIMSELF AND THOMAS N. EGERY, OF SAME PLACE.

IMPROVEMENT IN SAW-MILLS.

Specification forming part of Letters Patent No. 114,426, dated May 2, 1871.

*To all whom it may concern:*

Be it known that I, MARSHAL J. EGERY, of Bangor, in the county of Penobscot and State of Maine, have invented a new and useful Device for Adjusting the Overhang of Saws; and I hereby declare the following to be a full, clear, and exact description thereof, which will enable others to make and use my invention, reference being had to the accompanying drawings, forming a part of this specification, in which—

Figure 1 shows a front elevation; Fig. 2, a side view; Fig. 3, a detail of the adjusting-gears.

Same letters show like parts.

The object of my invention is to provide a means of adjusting the overhang of gang or single up-and-down saws which will be at once simple, ready, and effectual. By my device the change may be made while the saws are in motion by advancing or withdrawing the slide-rods upon which the upper slide-boxes move without disturbing the boxes themselves. I effect the change by means of screws at both ends of the rods, working simultaneously, and moving the rods out or in in a plane parallel with the frame of the machine. The saw-frame is attached to the boxes by means of trunnions passing into them, so that the frame is free to adjust itself without any strain on it or the boxes.

The operation of my device will be readily understood by reference to the drawings.

At $a$, Fig. 1, is shown the saw-frame, connected by the trunnions $b\ b\ b'\ b'$ (shown in dotted lines) to the slide-boxes $c\ c\ c'\ c'$. The upper slide-boxes, $c\ c$, move upon the slide-rods $d\ d$, both of which rods are connected to the standards $e\ e$ of the machine at both ends by passing between the arms $f\ f\ g\ g\ h\ h\ i\ i$, fixed to said standards, between which arms the rods are allowed a backward and forward motion, but are prevented from moving perpendicularly by shoulders bearing against the arms. This to-and-fro motion is communicated to both ends of these rods and to both rods at the same time by and through the four screws $j\ j\ j'\ j'$, passing through the standards $a$ and into female screws in the ends of the rods $d\ d$. The screws are operated simultaneously by the crank $k$, attached to the shaft $m$. This shaft has upon it the bevel-gears $l\ l$, one at each end, which gears mesh into the gears $n\ n$, attached to the screws $j\ j$ on each side of the frame, and communicate to them the motion of the crank. These gears $n\ n$ in their turn give motion to the screws $j'\ j'$ at the lower ends of the slide-rods. This they do through the gears $p\ p$, transmitting the motion through the shafts $q\ q$ to the bevel-gears $r'\ r'$, which mesh into the teeth of the bevel-gears $o\ o$ on the heads of the lower screws, $j'\ j'$. Thus it will be seen that, both upper and lower screws moving equally, the slide-rods will always be kept parallel with the standards of the machine, while the upper end of the saw-frame can be advanced or withdrawn at pleasure by moving the crank $k$. The trunnions allow this to be done with ease, as the saw-frame is by them permitted to turn in the boxes. The screws $j\ j\ j'\ j'$ are fixed to the frame of the machine, so that they always retain their position in it, and the action of the thread is confined in its operation to the slide-rods. The crank can be placed at the lower ends of the slide-rods, if desired.

By this device of making the slide-rods movable I obviate the necessity of stopping the saws when it is wished to change the overhang, and save much time and labor over the old methods.

In applying my device to single saws the shaft $m$ would of course be omitted, and the parts consist of the bevels $l$, $n$, $p$, and $r$, shaft $q$, and screws $j\ j'$, arranged substantially as before, and operated by a crank in like manner.

What I claim as my invention, and desire to secure by Letters Patent, is—

1. The combination of the guide-rods $d\ d$, as herein described, screws $j\ j\ j'\ j'$, crank $k$, shafts $q$ and $m$, and gears $l$, $n$, $o$, $p$, and $r$, as and for the purposes set forth.

2. The combination of the above-described guide-rods, operating as set forth, with the saw-frames suspended, as described, to the slide-boxes by the trunnions $b\ b\ b'\ b'$, as specified.

MARSHAL J. EGERY.

Witnesses:
 W. F. SEAVEY,
 F. F. FRENCH.